United States Patent
Shimura et al.

(10) Patent No.: US 6,652,254 B2
(45) Date of Patent: Nov. 25, 2003

(54) MOLDING APPARATUS INCLUDING SCREW FOR MOLDED ARTICLES OF THERMOPLASTIC GAS IMPREGNATED RESIN

(75) Inventors: Satoshi Shimura, Kyoto (JP); Hitoshi Kawauchi, Kyoto (JP); Hiroyuki Hirano, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 10/220,242

(22) PCT Filed: Jan. 9, 2002

(86) PCT No.: PCT/JP02/00051
§ 371 (c)(1),
(2), (4) Date: Aug. 30, 2001

(87) PCT Pub. No.: WO02/055282
PCT Pub. Date: Jul. 18, 2002

(65) Prior Publication Data
US 2003/0044480 A1 Mar. 6, 2003

(30) Foreign Application Priority Data
Jan. 11, 2001 (JP) ............................................ 2001-003780

(51) Int. Cl.[7] ........................... B29C 45/48; B29C 44/02
(52) U.S. Cl. ............... 425/4 R; 425/208; 425/209; 425/557; 425/DIG. 228; 425/817 R; 366/88; 366/89; 366/91
(58) Field of Search .......................... 425/4 R, 817 R, 425/557, DIG. 228, 208, 209; 366/88, 89, 91

(56) References Cited
U.S. PATENT DOCUMENTS

| | | | | |
|---|---|---|---|---|
| 3,499,186 A | * | 3/1970 | Sassa | 425/4 R |
| 3,822,331 A | * | 7/1974 | Cogliano | 264/51 |
| 4,255,368 A | * | 3/1981 | Olabisi | 264/45.5 |
| 4,390,332 A | * | 6/1983 | Hendry | 425/4 R |
| 4,409,165 A | * | 10/1983 | Kim | 264/53 |
| 5,089,193 A | | 2/1992 | Behrens et al. | 264/50 |
| 5,158,986 A | | 10/1992 | Cha et al. | 521/82 |
| 5,997,781 A | | 12/1999 | Nishikawa et al. | 264/45.1 |
| 6,169,122 B1 | * | 1/2001 | Blizard et al. | 521/79 |

FOREIGN PATENT DOCUMENTS

| | | |
|---|---|---|
| FR | 2.098.326 A1 | 3/1972 |
| JP | S47-002436 | 2/1972 |
| JP | S51-042767 | 4/1976 |
| JP | 355067420 A * | 5/1980 |
| JP | H10-230528 | 9/1998 |

* cited by examiner

Primary Examiner—Robert Davis
Assistant Examiner—Joseph S Del Sole
(74) Attorney, Agent, or Firm—Rader Fishman & Grauer (57) ABSTRACT

The invention provides a molding apparatus adapted to use a screw having an overall length permitting the use of an existing molding machine cylinder as it is, and is capable of realizing a gas impregnation step. The screw 3 for use in the gas impregnation step comprises a resin melting portion C disposed at an upstream position for rendering the resin molten, a molten resin nonfilled-up portion E integral with the downstream side of the resin melting portion C for making the resin lower than an inert gas at a gas supply opening 5 in pressure, and a gas impregnation portion D integral with the downstream side of the molten resin nonfilled-up portion E for supplying the inert gas and impregnating the molten resin with the inert gas.

7 Claims, 3 Drawing Sheets

MOLECULAR CHAINS OF RESIN

MOLDING APPARATUS INCLUDING SCREW FOR MOLDED ARTICLES OF THERMOPLASTIC GAS IMPREGNATED RESIN

TECHNICAL FIELD

The present invention relates to molding apparatus for use in a process for preparing thermoplastic resin molded articles, especially thermoplastic expansion-molded articles, or molded articles of thermoplastic resin having a high melt viscosity and difficult to mold in a molten state.

BACKGROUND ART

Expansion-molded articles of thermoplastic resin can be prepared by a process wherein a chemical blowing agent is used (for chemical expansion) or by a process wherein a gas, such as a chlorofluorocarbon, butane, pentane, carbon dioxide or nitrogen, is directly supplied to and dissolved in the resin for use as a blowing agent (for physical expansion). In recent years, there is a growing demand for producing expansion-molded articles of thermoplastic resin with use of carbon dioxide, nitrogen or like inert gas for physical expansion in consideration of sanitation and environment.

In view of the above situation, many studies have been made on processes for preparing expansion-molded articles of thermoplastic resin with use of inert gases (see, for example, JP-A No. 10-230528/1998).

However, since many of the conventional processes intend to solve the problem of how to produce expansion-molded articles of fine cells, they require very complex equipment comprising a plurality of devices. To realize physical expansion, there is a need to use a cylinder, screw and controller which are designed specially, in the gas impregnation step of melting a thermoplastic resin, supplying an inert gas to the molten resin and impregnating the resin with the gas by mixing. The equipment then requires devices which are made anew or substantial modification of existing devices to result in the problem of an increased cost.

In view of the foregoing problem of the prior art, an object of the present invention is to provide a molding apparatus which is adapted to realize a gas impregnation step by continuously supplying carbon dioxide, nitrogen or like inert gas to a thermoplastic resin at a relatively low pressure with good stability and using a screw having such an overall length as to permit the use of, an existing molding machine cylinder as it is.

DISCLOSURE OF THE INVENTION

We have conducted research not from the viewpoint of how to produce expansion-molded articles of very fine cells but from the viewpoint of how to realize physical expansion with use of an inert gas, such as carbon dioxide or nitrogen, with the greatest possible ease and at as low a cost as possible. Consequently, we have realized physical expansion easily at a low cost by causing a screw to perform all the functions of melting a thermoplastic resin, supplying an inert gas to the molten resin and mixing the gas with the molten resin for impregnation, utilizing existing injection molding cylinder, controller, etc. as they are.

The molding apparatus of the invention for preparing molded articles of thermoplastic resin is an apparatus for use in practicing a molding process for producing molded articles of thermoplastic resin which comprises the gas impregnation step of supplying an inert gas from a gas supply opening in a screw to a thermoplastic resin melted by the rotation of the screw within a molding machine cylinder to impregnate the molten resin with the inert gas, and the molding step of obtaining an expansion-molded article from the gas-impregnated molten resin, the apparatus being characterized in that the screw for use in the gas impregnation step comprises a resin melting portion positioned in an upstream region of the cylinder for rendering the resin molten, a molten resin nonfilled-up portion integral with a downstream side of the resin melting portion for making the resin lower than the inert gas at the gas supply opening in pressure, and a gas impregnation portion integral with a downstream side of the molten resin nonfilled-up portion for supplying the inert gas and impregnating the molten resin with the inert gas.

Figure 4:
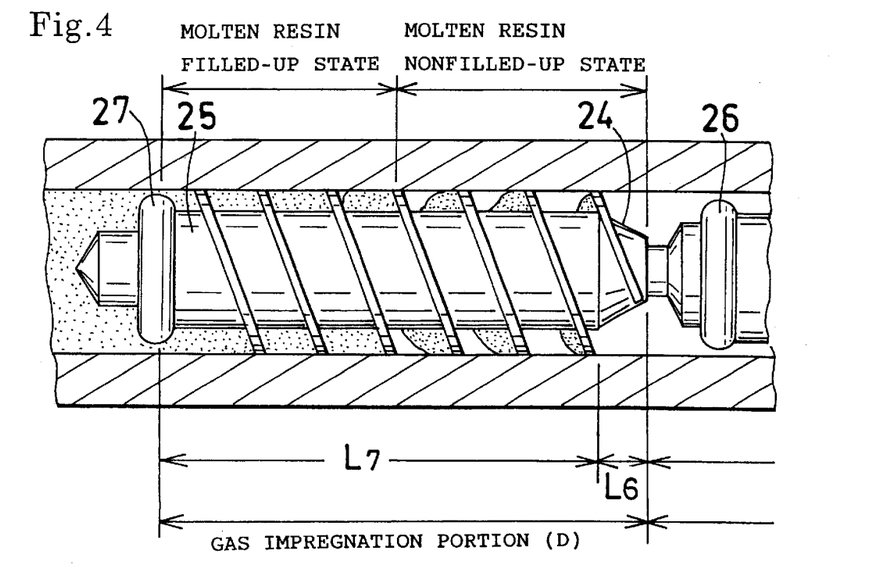
FIG. 4 is an enlarged side elevation showing a gas impregnation portion as nonfilled-up with a resin and as filled-up therewith.

The molten resin nonfilled-up portion of the screw is a portion formed by reducing the screw shaft diameter or increasing the flight pitch thereof. The provision of the molten resin nonfilled-up portion produces an enlarged space defined by the screw fight, the cylinder and the screw shaft, whereby the resin within this space can be made lower than the gas at the gas supply opening in pressure. The molten resin nonfilled-up portion extends from the downstream end of the resin melting portion to a position downstream therefrom where the space defined by the screw fight, the cylinder and the screw shaft is greatest. The space defined by the screw fight, the cylinder and the screw shaft is smaller in the gas impregnation portion extending from the downstream end of the nonfilled-up portion than in the molten resin nonfilled-up portion, so that the impregnation portion becomes gradually filled up with the molten resin which used to be in the nonfilled-up state. Thus, the gas impregnation portion has two states as shown in FIG. 4, i.e., a molten resin nonfilled-up state in the upstream region and a molten resin filled-up state in the downstream region. Since the screw has the gas supply opening in the region of such a molten resin nonfilled state, a required amount of the inert gas is supplied to the molten resin with good stability.

If an attempt is made to additionally provide the gas impregnation portion at the forward end of the screw of the conventional apparatus, the screw becomes greater in overall length by an amount corresponding to the added portion, and the cylinder of an existing molding machine can not be utilized, whereas the construction of the invention described above makes it possible to provide the gas impregnation portion while enabling the screw to retain such an overall length as to permit the use of the cylinder of an existing molding machine.

In the molding apparatus described, the screw preferably has a gas inlet channel formed in the upstream end thereof, and a gas supply channel communicating with the gas inlet channel and extending through the screw longitudinally thereof, the gas supply opening being formed in the gas impregnation portion and communicating with the gas inlet channel via the gas supply channel. It is then possible to use an existing cylinder without making almost any modification therein, that is, without modifying the gas inlet, gas supply channel and gas supply opening thereof.

Figure 3:
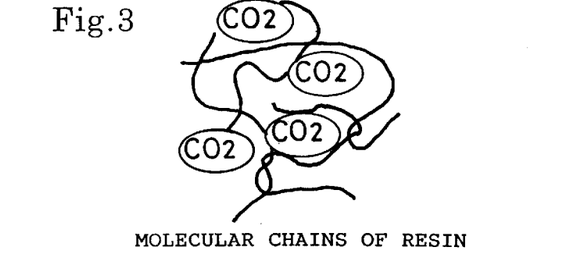
FIG. 3 is a diagram showing the concept of a thermoplastic resin plasticizing effect of inert gas.

The resin melting portion of the screw comprises a solid (hereinafter "solid" means powder, pellets or the like) transport part disposed at an upstream position and having a small screw shaft diameter, a molten resin transport part disposed a downstream position and having a large screw shaft diameter, and a compression melting part positioned between the two parts and having a screw shaft diameter gradually increasing downstream, the lengths of the screw parts and portions preferably having the following relationships with the cylinder diameter D:

length $L_1$ of the solid transport part=5D–10D,
length $L_2$ of the compression melting part=3D–6D,
length $L_3$ of the molten resin transport part=1D–4D,
length $L_4$ of the molten resin nonfilled-up portion= 0.1D–2D, and
length $L_5$ of the gas impregnation portion=4D–10D. The resin can then be plasticized with heat and also with the inert gas which affords an additional plasticizing effect, with the result that the molten resin is impregnated with the inert gas positively and plasticized more effectively with the inert gas. The plasticizing effect produced by the inert gas refers to the phenomenon shown in FIG. 3 that molecules of the inert gas (carbon dioxide in the illustration) dissolving in the resin between molecular chains thereof expand the spaces between the molecular chains, consequently increasing the free volume of the molecular chains to plasticized the resin substantially in the same manner as by the plasticization with heat.

The solid transport part is given a length $L_1$ of 5D to 10D (optimally about 8D) because a diminution in the solid transport part due to the metering stroke is considered in designing the resin melting portion. If $L_1$ is smaller than 5D, it becomes impossible to transport the resin in the form of unmelted pellets or powder from the hopper with good stability, whereas if $L_1$ is greater than 10D, the screw has an increased overall length, presenting difficulty in utilizing the existing cylinder.

The compression melting part is given a length $L_2$ of 3D to 6D (optimally about 4D) because if $L_2$ is smaller than 3D, a satisfactory molten state is not available, and further because if $L_2$ is greater than 6D, the screw has an increased overall length.

The molten resin transport part is given a length $L_3$ of 1D to 4D (optimally about 2D) because if $L_3$ is smaller than 1D, it is impossible to prevent the inert gas from leaking into the resin supply hopper, and further because if $L_3$ is greater than 4D, the screw has an increased overall length. To suppress variations in the resin pressure at the downstream end of the molten resin transport part and to ensure promoted melting, it is generally desirable that $L_3$ be greater, whereas it is only required according to the present invention to prevent the inert gas at the downstream end of the molten resin transport part from leaking into the resin supply hopper. The desired performance is fully available if $L_3$ is up to 4D.

The molten resin nonfilled-up portion is intended to provide a molten resin nonfilled state to ensure stabilized supply of the inert gas. Satisfactory performance can be achieved if the length $L_4$ thereof is up to 2D (preferably up to about 1D). If $L_4$ is greater than 2D, the screw has an increased overall length.

The gas impregnation portion comprises a tapered part gradually increasing in screw shaft diameter from the downstream end of the molten resin nonfilled-up portion, and a solid cylinder part downstream from this part and having a constant screw shaft diameter. Preferably, the length $L_6$ of the tapered part has the relationship of $L_6$=0.5D–3D with the cylinder diameter D. The molten resin sent from the resin melting portion (where the space defined by the screw flight, the cylinder and the screw shaft is smallest) to the molten resin nonfilled-up portion (where the space is greatest) is delivered to the tapered part where the space defined by the screw flight, the cylinder and the screw shaft is smaller than in the nonfilled-up portion and then to the solid cylinder portion where the space is greater than in the resin melting portion. Consequently, the molten resin in the gas impregnation portion has two states as shown in FIG. 4, i.e., a nonfilled-up state in the tapered part and the upstream region of the solid cylinder part and a filled-up state in the downstream region of the solid cylinder part. The molten resin is made to have two states in order to realize stabilized supply of the gas in the molten resin nonfilled-up state, and prevent a discharge of the gas due to a leak to the injection nozzle in the molten resin filled-up state.

Preferably the length $L_5$ of the gas impregnation portion is 4D to 10D (optimally about 7D). If $L_5$ is smaller than 4D, it is impossible to prevent the gas from being forced out due to the leak of the gas to the injection nozzle, whereas if $L_5$ is greater than 10D, the screw will have an increased overall length. It is desired that the length $L_6$ of the tapered part be at least 0.5 to up to 3D to stabilize the molten resin nonfilled-up state and the molten resin filled-up state.

By giving the above construction to the screw, the screw can be caused to perform all the functions of melting a thermoplastic resin, supplying an inert gas to the molten resin and impregnating the molten resin with the gas by mixing. Moreover, since the screw can be designed with a short overall length, existing injection molding cylinder and controller can be utilized. Thus, physical expansion can be realized easily at a low cost by using the screw having the above functions.

The molding machine of the present invention is not limited to use for injection molding but is applicable also to extrusion molding, blow molding, injection blow molding, film forming, etc.

The thermoplastic resin for use in the present invention is not limited particularly. Examples of such resins are resins having a high melt viscosity and therefore difficult to mold in a molten state, resins easily decomposable thermally, resins containing a low-boiling-point additive or an additive easily decomposable thermally and difficult to mold, etc.

Examples of resins having a high melt viscosity and therefore difficult to mold in a molten state are ultra-high-molecular-weight polyethylene, polyvinyl chloride having an ultrahigh degree of polymerization, polytetrafluoroethylene, polyimide and like resins for use as engineering plastics.

Examples of resins easily decomposable thermally are polylactic acid, polyhydroxybutyrate and like biodegradable resins, polyvinyl chloride having a high degree of chlorination, polyacrylonitrile, etc.

The inert gas for use in the present invention is not limited specifically insofar as the gas is nonreactive with the resin and does not degrade the resin or produces no adverse effect thereon. Examples of such gases are carbon dioxide, nitrogen, argon, neon, helium, oxygen and like inorganic gases, chlorofluorocarbons, low-molecular-weight hydrocarbons and like organic gases.

Preferable among these gases are inorganic gases because they are less likely to exert an adverse effect on the environment and need not be collected after use. Carbon dioxide is more preferable from the viewpoint that the gas is highly soluble in resins which are difficult to mold, highly effective for melting the resin and releasable directly into the atmosphere almost without causing any harm. Inert gases may be used singly, or at least two kinds of gases are usable in combination.

BEST MODE OF CARRYING OUT THE INVENTION

Examples of the invention will be described below in detail with reference to the drawings.

Example 1

The drawings show an embodiment of molding apparatus according to the invention.

Figure 1:
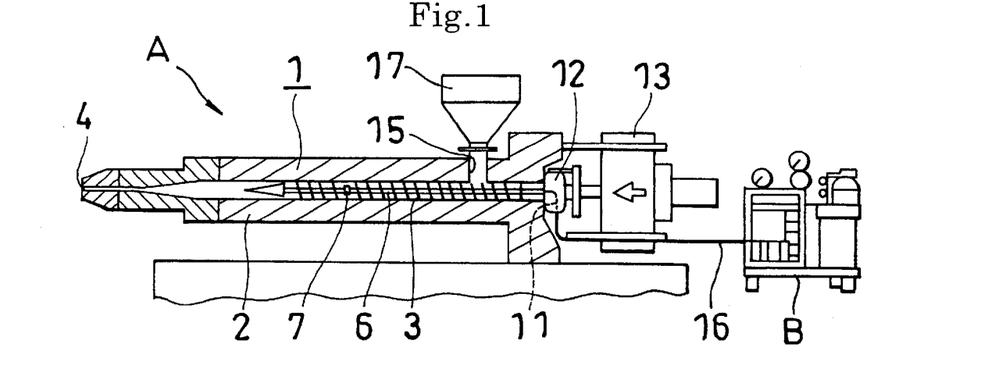
FIG. 1 is a side elevation partly broken away and showing an embodiment of molding apparatus of the invention for preparing molded articles of thermoplastic resin.
Figure 2:
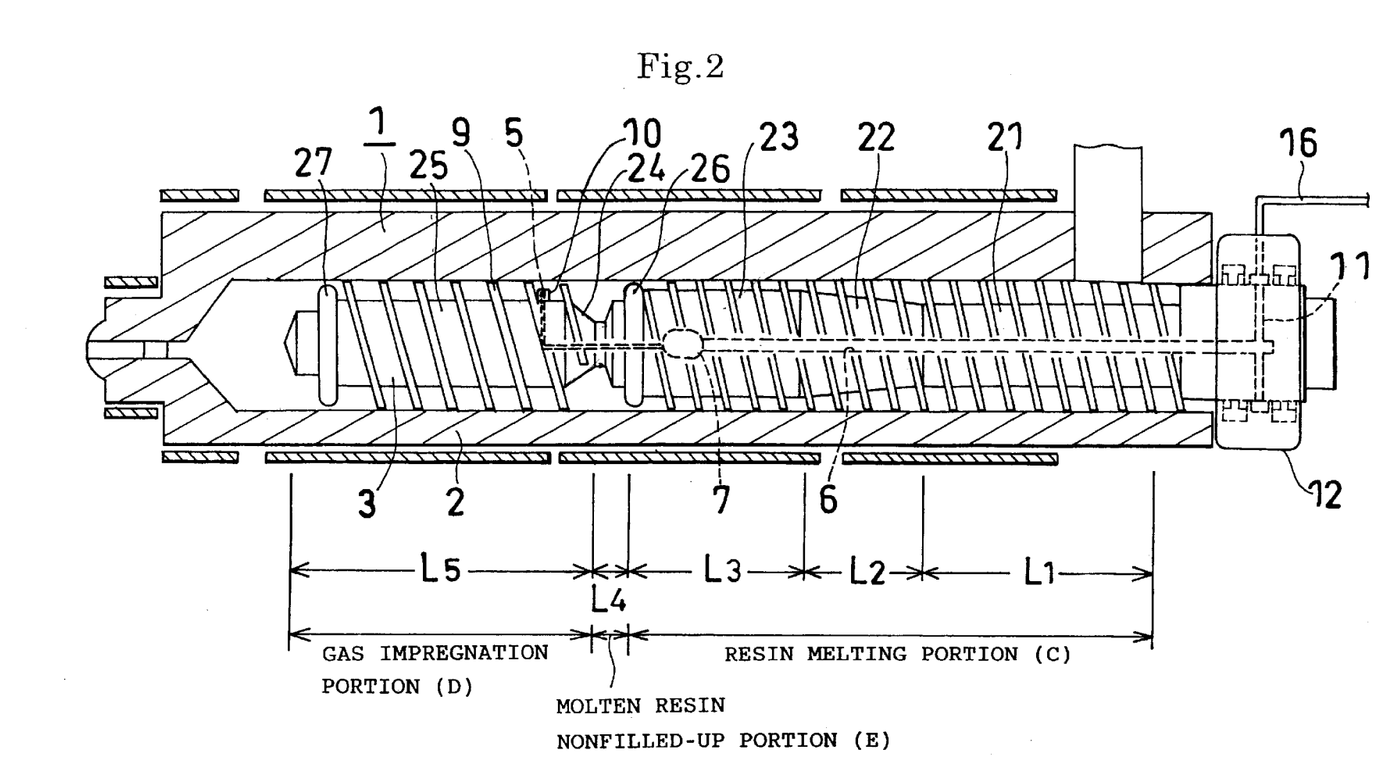
FIG. 2 is a side elevation partly broken away and generally showing an injection molding machine of the molding apparatus in its entirety.

The molding apparatus A is adapted for use in the injection molding of a thermoplastic resin. As shown in FIGS. 1 and 2, the apparatus comprises an injection molding machine 1 and a gas injector B for supplying a gas to the machine. The injection molding machine 1 mainly comprises a cylinder 2 and a screw 3 disposed in the interior thereof.

The screw 3 within the cylinder 2 comprises a resin melting portion C positioned in an upstream region of the cylinder for rendering the resin molten by rotation, a molten resin nonfilled-up portion E integral with the downstream side of the resin melting portion C for making the resin lower than an inert gas at a gas supply opening 5 in pressure, and a gas impregnation portion D integral with the downstream side of the molten resin nonfilled-up portion E for supplying the inert gas and impregnating the molten resin with the inert gas.

The resin melting portion C comprises a solid transport part 21 disposed at an upstream position and having a small screw shaft diameter, a compression melting part 22 integral with the downstream side of the solid transport part 21 and having a screw shaft diameter gradually increasing downstream, and a molten resin transport part 23 integral with the downstream side of the compression melting part 22 and having a large screw shaft diameter.

The molten resin nonfilled-up portion F is a portion having a space defined by the screw flight 9, the cylinder 2 and the shaft of the screw 3 and enlarged by gradually or stepwise making the shaft diameter of the screw 3 smaller than the screw shaft diameter at the downstream end of the resin melting portion C. The molten resin transported from the space within the cylinder around the resin melting portion C to the cylinder space around the molten resin nonfilled-up portion E is in a state not filling up this space around the portion E, with the result that the resin within this space cylinder 3 space around the portion E is made lower than the gas at the gas supply opening 5 in pressure. The molten resin nonfilled-up portion E extends over the range indicated by $L_4$ in FIG. 2, i.e., from the downstream end of the resin melting portion C to a position (the upstream end of the gas impregnation portion D) downstream therefrom where the space defined by the screw fight 9, the cylinder 2 and the shaft of the screw 3 is greatest.

The gas impregnation portion D comprises a tapered part 24 gradually increasing in screw shaft diameter from the downstream end of the molten resin nonfilled-up portion E, and a solid cylinder part 25 downstream from this part and having a constant screw shaft diameter. As shown in FIG. 2, the gas supply opening 5 is formed in the shaft surface of the screw 3 at the upstream end of the solid cylinder part 25 of the gas impregnation portion D.

The molten resin sent from the resin melting portion C (where the space defined by the screw flight 9, the cylinder 2 and the screw shaft is smallest) to the molten resin nonfilled-up portion E (where the space is greatest) is delivered to the tapered part 24 where the space defined by the screw flight 9, the cylinder 2 and the shaft of the screw 3 is smaller than in the nonfilled-up portion E and then to the solid cylinder portion 25 where the space is greater than in the resin melting portion C. Consequently, the molten resin in the gas impregnation portion D has two states as shown in FIG. 4, i.e., a nonfilled-up state in the tapered part 24 and the upstream region of the solid cylinder part 25 and a filled-up state in the downstream region of the solid cylinder part 25. The molten resin is made to have two states in order to realize stabilized supply of the gas to the molten resin in the nonfilled-up state, and to prevent a discharge of the gas due to a leak to the nozzle by the molten resin in the filled-up state.

Check rings 26, 27 are provided for sealing respectively at the downstream end of the resin melting portion C and the downstream end of the gas impregnation portion D. The gas is prevented from leaking downstream by the check ring 26 and the molten resin around the molten resin transport part 23, and the downstream leak of the gas is prevented by the molten resin in the filled-up state around the gas impregnation portion D and the check ring 27.

The screw 3 is rotated by a drive motor 13, and advanced or retracted. As shown in FIG. 2, the flight 9 of the screw 3 has a greater pitch on the gas impregnation portion D than on the resin melting portion C. Since the screw 3 is thus formed, the molten resin can be fed by the gas impregnation portion in about 1.2 times the amount, i.e., the rate, of feed by the resin melting portion C. In the case where the rate of feed of the molten resin is adjustable by varying the back pressure and the speed of rotation of the screw, the pitch need not always be altered.

The screw 3 has a gas inlet channel 11 formed in its upstream end, and a gas supply channel 6 extending through the screw longitudinally thereof and communicating with the gas inlet channel 11. The gas supply opening 5 formed in the screw surface of the gas impregnation portion D communicates with the gas inlet channel 11 through the gas supply channel 6. The gas supply channel 6 is provided with a check valve 7 positioned close to the gas supply opening 5 for preventing molten resin from ingressing into the gas supply channel 6 from the supply opening 5. The gas injector B is connected to the gas inlet channel 11 by a gas inlet pipe 16. The pipe 16 is connected to a seal box 12 covering the gas inlet channel 11. The closed space within the seal box 12 is in communication with the inlet channel 11.

At the upstream end of solid cylinder part 25 of the gas impregnation portion D, the gas supply channel 6 has a gas outlet end positioned between adjacent screw flight portions 9 and close to the downstream flight portion. A pin nozzle 10 projecting from the shaft surface of the screw 3 is connected to the outlet end. The gas supply opening 5 thus provided is in the form of a spout projecting from the shaft surface of the screw 3 at the upstream end of solid cylinder part 25 of the gas impregnation portion D. The gas supply opening 5 has an inside diameter of about 1.5 mm.

The material resin is supplied from a hopper 17 to the cylinder 2 of the injection molding apparatus A of the above construction through a feed inlet 15 and sent toward the forward end of the cylinder 2 while being melted and kneaded by the rotation of the screw 3. The melted and kneaded resin is sent to a pressure relief portion, i.e., the gas impregnation portion D.

On the other hand, carbon dioxide flowing out of the gas injector B enters the seal box 12 via the inlet pipe 16 and reaches the gas supply opening 5 resembling a spout by way of the gas inlet channel 11, the gas supply channel 6 and the check valve 7. The gas is supplied from the opening 5 to the interior of the cylinder at the upstream end of the gas impregnation portion D. Consequently, the molten resin sent downstream through the impregnation portion D is impregnated with the gas. Since the gas supply opening 5 is provided in the form of a spout projecting from the shaft surface of the screw 3, the opening 5 is unlikely to be covered with the molten resin. Owing to the provision of the molten resin nonfilled-up portion E, the molten resin in the nonfilled-up state is lower than the gas at the gas supply opening 5 in pressure, so that there is no likelihood that the molten resin will interfere with the gas supply, permitting the molten resin to be impregnated with the gas at a relatively low pressure.

With the continuous transport of the molten resin to the forward end of the cylinder 2, the screw 3 is gradually retracted in accordance with the rate of feed of the resin, and a metering portion at the forward end of the cylinder 2 measures out a predetermined amount of molten resin.

The gas-impregnated molten resin thus measured out is injected into an injection mold from a nozzle 4 at the forward end of the injection molding machine 1 to obtain an expansion-molded article.

Figure 5:
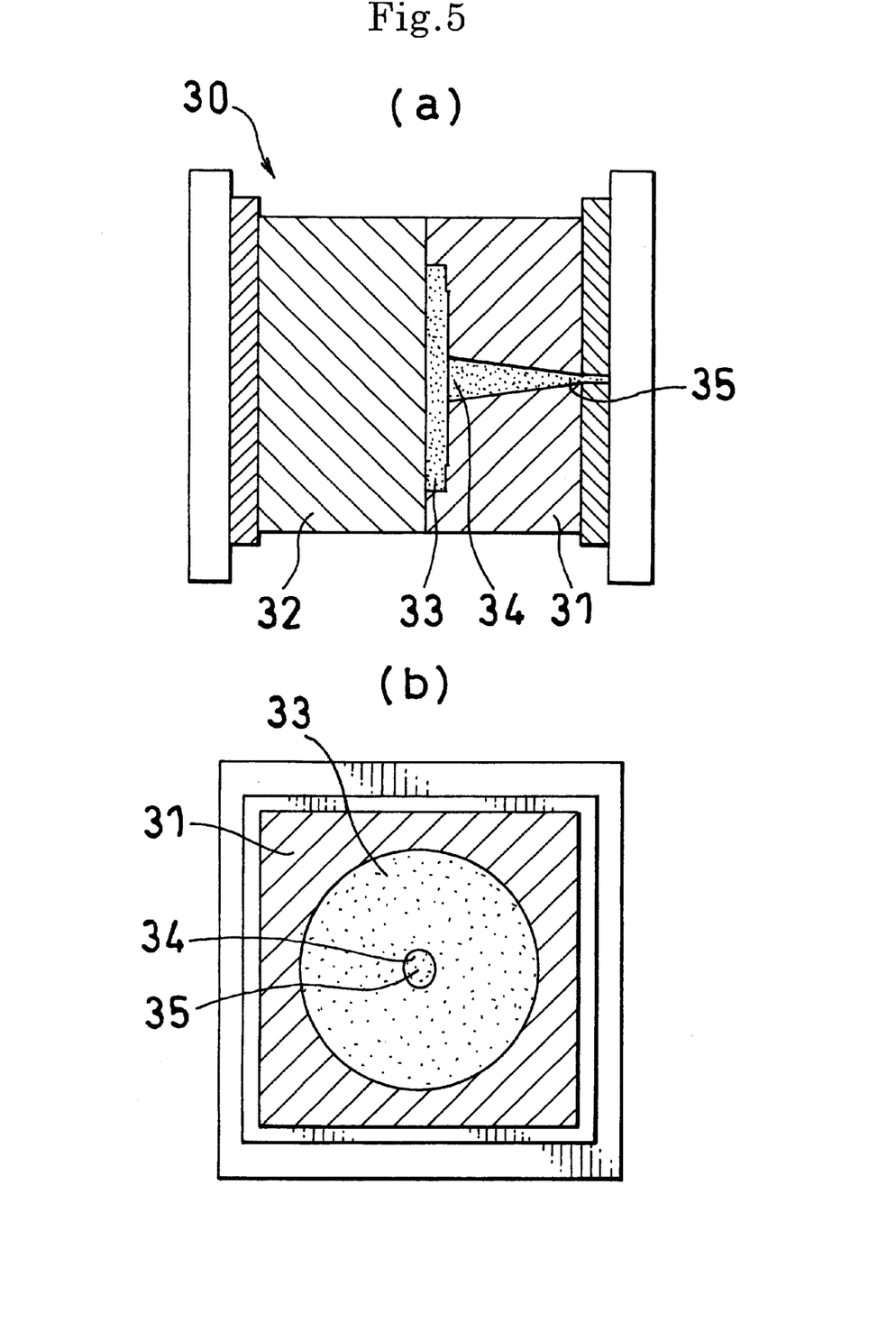
FIG. 5(a) is a view in vertical section showing an embodiment of mold for use in the molding apparatus of the invention for molded articles of thermoplastic resin.
FIG. 5(b) is a view in cross section of the same.

As shown in FIG. 5, the injection mold 30 comprises, for example, a stationary mold member 31 and a movable mold member 32, and has a cavity 33 in the form of a disk, a conical nozzle touch 34 extending from the cavity 33 in the direction of reflection, and a gate 35 provided at the forward end of the nozzle touch 34 and to be connected to the injection nozzle 4.

The molding process to be practiced by the injection molding apparatus A thus constructed is adapted to uniformly impregnate a molten resin with a gas within a short period of time, consequently providing an expansion-molded body having a homogeneous quality and fine cells with high productivity.

For example, the component portions or parts have the following dimensions. The screw is 60 mm in shaft diameter and 60 mm in flight pitch. Assuming that the cylinder diameter is D, the length $L_1$ of the solid transport part is 8D, the length $L_2$ of the compression melting part is 4D, the length $L_3$ of the molten resin transport part is 2D, the length $L_4$ of the molten resin nonfilled-up portion is 1D, the length $L_5$ of the gas impregnation portion is 7D, and the length $L_6$ of the tapered part is 1D. The thermoplastic resin used was a polypropylene manufactured by Nippon Polychem Co., Ltd. (grade: Novatic PPMA2), and the inert gas used was carbon dioxide. Measured out by the end metering portion was an amount corresponding to ½ of the capacity of the cavity 33 shown in FIG. 5 and having a thickness of 6 mm and a diameter of 200 mm.

Performance Evaluation Test

The apparatus was purged with a gas at the gas pressure of the gas supply opening 5 to check the hopper 17 and the nozzle 4 for a gas discharge and for a gas leak. The thermoplastic resin having carbon dioxide added thereto was filled into the cavity 33 through the nozzle touch 34, cooled for 120 seconds, and the mold 30 was thereafter opened to take out the resin therefrom. The expansion-molded article of thermoplastic resin obtained was checked for the state of expansion for evaluation. Table 1 shows the result of evaluation.

Example 2

The same procedure as in Example 1 was performed with the exception of using ABS manufactured by Denki Kagaku Kogyo K.K. (grade: Denka ABS CL301Q) as the thermoplastic resin, followed by evaluation in the same manner as above.

Table 1 shows the result of evaluation.

Example 3

The same procedure as in Example 1 was performed with the exception of using a polyethylene manufactured by Nippon Polychem Co., Ltd. (grade: Novatic HDHJ381) as the thermoplastic resin, followed by evaluation in the same manner as above. Table 1 shows the result of evaluation.

Example 4

The same procedure as in Example 1 was performed except that the construction of the screw was modified as will be described below. With the screw shaft diameter unchanged, the screw portions or parts were give the following lengths: length $L_1$ of the solid transport part=8D, length $L_2$ of the compression melting part=5D, length $L_3$ of the molten resin transport part=3D, length $L_4$ of the molten resin nonfilled-up portion=1D, length $L_5$ of the gas impregnation portion=5D, and length $L_6$ of the tapered part=2.5D. Evaluation was made in the same manner as in Example 1. Table 1 shows the result of evaluation.

TABLE 1

Results of Performance Evaluation Test

| | Resin | Item | Result of evaluation |
| --- | --- | --- | --- |
| Ex. 1 | PP (Novatic PPMA2) | Gas leak | No gas discharge from hopper and nozzle |
| | | State of expansion | Ratio 2 times, good expansion, uniform cell size |
| Ex. 2 | ABS (Denka ABS CL301Q) | Gas leak | No gas discharge from hopper and nozzle |
| | | State of expansion | Ratio 2 times, good expansion, uniform cell size |
| Ex. 3 | PE (Novatic HDHJ381) | Gas leak | No gas discharge from hopper and nozzle |
| | | State of expansion | Ratio 2 times, good expansion, uniform cell size |
| Ex. 4 | PP (Novatic PPMA2) | Gas leak | No gas discharge from hopper and nozzle |
| | | State of expansion | Ratio 2 times, good expansion, uniform cell size |

PP: polypropylene
PE: polyethylene

As will be apparent from Table 1, it was possible to prepare molten resins impregnated with carbon dioxide without any gas leak to the resin supply hopper and the injection nozzle in all of Examples 1, 2, 3 and 4, and to produce from the gas-impregnated resins expansion-molded articles of thermoplastic resin which were satisfactory in the state of expansion (free from voids or cavities) and uniform in cell size.

INDUSTRIAL APPLICABILITY

The molding apparatus of the invention for producing molded articles of thermoplastic resin uses a screw having an overall length permitting the use of an existing molding machine cylinder as it is, and is capable of realizing at a low cost the gas impregnation step of impregnating a molten resin with a gas supplied thereto continuously at a relatively low pressure with good stability to produce molded thermoplastic resin articles by physical expansion.

I claim:

1. An apparatus for use in practicing an injection molding process for producing molded articles of thermoplastic resin which comprises the gas impregnation step of supplying a carbon dioxide gas from a gas supply opening to a thermoplastic resin rendered molten by the rotation of a screw within a molding machine cylinder to impregnate the molten resin with the carbon dioxide gas, and the molding step of obtaining an expansion-molded article from the gas-impregnated molten resin, the injection molding apparatus being characterized in that the screw for use in the gas impregnation step comprises a resin melting portion disposed at an upstream position for rendering the resin molten, a molten resin nonfilled-up portion integral with a downstream side of the resin melting portion for making the resin lower than the carbon dioxide gas at the gas supply opening in pressure, and a gas impregnation portion integral with a downstream side of the molten resin nonfilled-up portion for supplying the inert gas and impregnating the molten resin with the carbon dioxide gas wherein the resin melting portion of the screw comprises a solid transport part disposed at an upstream position and having a small screw shaft diameter, a compression melting part integral with a downstream side of the power transport part and having a screw shaft diameter gradually increasing downstream, and a molten resin transport part integral with a downstream side of the compression melting part and having a large screw shaft diameter, wherein the gas impregnation portion comprises a tapered part gradually increasing in screw shaft diameter from a downstream end of the molten resin nonfilled-up portion, and a solid cylinder part downstream from the tapered part, wherein the screw has a gas inlet channel formed in an upstream end thereof, and a gas supply channel communicating with the gas inlet channel and extending through the screw longitudinally thereof, the gas supply opening being located at the upstream end of the solid cylinder part of the gas impregnation portion and positioned between adjacent screw flight portions and close to the downstream flight portion, the gas supply channel being provided with a check valve, the lengths of the screw parts and portions having the following relationships with a cylinder diameter D:

length $L_1$ of the solid transport part=5D–10D, length $L_2$ of the compression melting part=3D–6D, length $L_3$ of the molten resin transport part=1D–4D, length $L_4$ of the molten resin nonfilled-up portion= 0.1D–2D, and length $L_5$ of the gas impregnation portion=4D–10D.

2. A molding apparatus for molded articles of thermoplastic resin according to claim 1 wherein a length $L_6$ of the tapered part has the relationship of $L_{6=0.5}D$–3D with the cylinder diameter D.

3. A molding apparatus for molded articles of thermoplastic resin according to claim 1 or 2 wherein the screw has a gas inlet channel formed in an upstream end thereof, and a gas supply channel communicating with the gas inlet channel and extending through the screw longitudinally thereof, the gas supply opening being formed in the gas impregnation portion and communicating with the gas inlet channel via the gas supply channel.

4. An apparatus for use in practicing a molding process for producing molded articles of thermoplastic resin which comprises the gas impregnation step of supplying an inert gas from a gas supply opening to a thermoplastic resin rendered molten by the rotation of a screw within a molding machine cylinder to impregnate the molten resin with the inert gas, and the molding step of obtaining an expansion-molded article from the gas-impregnated molten resin, the molding apparatus being characterized in that the screw for use in the gas impregnation step comprises a resin melting portion disposed at an upstream position for rendering the resin molten, a molten resin nonfilled-up portion integral with a downstream side of the resin melting portion for making the resin lower than the inert gas at the gas supply opening in pressure, and a gas impregnation portion integral with a downstream side of the molten resin nonfilled-up portion for supplying the inert gas and impregnating the molten resin with the inert gas wherein the gas impregnation portion comprises a tapered part gradually increasing in screw shaft diameter from a downstream end of the molten resin nonfilled-up portion, and a solid cylinder part downstream from the tapered part and having a constant screw shaft diameter, a length $L_6$ of the tapered part having the relationship of $L_{6=0.5}D$–3D with a cylinder diameter D.

5. An injection molding machine, comprising:

a longitudinally extending cylinder having a longitudinally extending screw-receiving bore formed therein; and a longitudinally extending screw sized and adapted to rotate about an axis of rotation within the screw-receiving bore and having a resin melting portion with a narrow pitch flight, a gas impregnation portion with a wide pitch flight disposed downstream of the resin melting portion and a molten resin nonfilled-up portion connected to and disposed between the resin melting portion and the gas impregnation portion, the resin melting portion having a cylindrical solid transport part, a cylindrical molten resin transport part disposed downstream of the solid transport part, a tapered compression melting part connected to and between the solid transport part and the molten resin transport part and having a compression melting part diameter increasing in a downstream direction, the narrow pitch flight having a narrow pitch connected to and spiraling about the solid transport part, the compression melting part and the molten resin transport part, the solid transport part having a first diameter, the molten resin transport part having a second diameter larger than the first diameter, the compression melting part having a minimum diameter equal to the first diameter and a maximum diameter equal to the second diameter, the gas impregnation portion including a solid cylinder part and a tapered part connected upstream to the solid cylinder part with the solid cylinder part having a third diameter and the tapered part having a maximum diameter equal to the third diameter, the wide pitch flight having a wide pitch larger than the narrow pitch of the narrow pitch flight and connected to and spiraling about the solid cylinder part and at least a larger-diameter portion of the tapered part, the molten resin nonfilled-up portion having at least a cylindrically-shaped molten resin nonfilled-up part having a fourth diameter smaller than the first, second and third diameters, wherein the screw includes a gas inlet channel extending longitudinally along the axis of rotation through the resin melting portion and the molten resin nonfilled-up portion and partially through the gas impregnation portion to terminate at a nozzle projecting from the solid cylinder part of the gas impregnation portion between consecutive turns of wide pitch flight.

6. An injection molding machine according to claim 5, wherein the screw includes a first check ring disposed concentrically around and connected to a downstream end portion of the solid cylinder part of the gas impregnation portion and a second check ring disposed concentrically around and connected to a downstream end portion of the molten resin transport part of the resin melting portion.

7. An injection molding machine according to claim 6, wherein the first and second check rings are sized and adapted as gas seals.

* * * * *

UNITED STATES PATENT AND TRADEMARK OFFICE
CERTIFICATE OF CORRECTION

PATENT NO. : 6,652,254 B2  Page 1 of 1
DATED : November 25, 2003
INVENTOR(S) : Satoshi Shimura et al.

It is certified that error appears in the above-identified patent and that said Letters Patent is hereby corrected as shown below:

<u>Title page,</u>
Item [86], the Filing Date should read: -- [86] Filing Date: August 30, 2002 --

Signed and Sealed this

Sixteenth Day of March, 2004

JON W. DUDAS
*Acting Director of the United States Patent and Trademark Office*